UNITED STATES PATENT OFFICE.

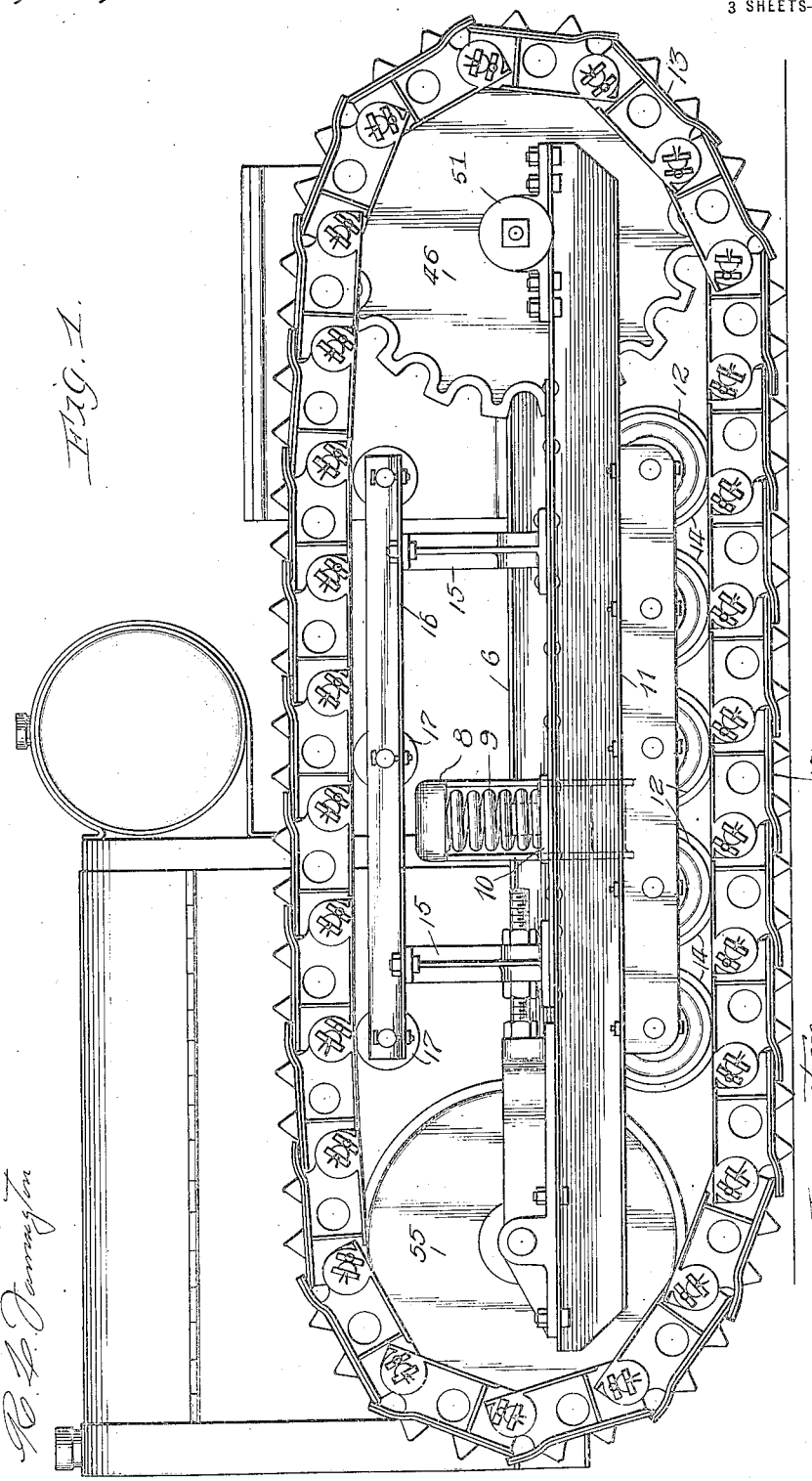

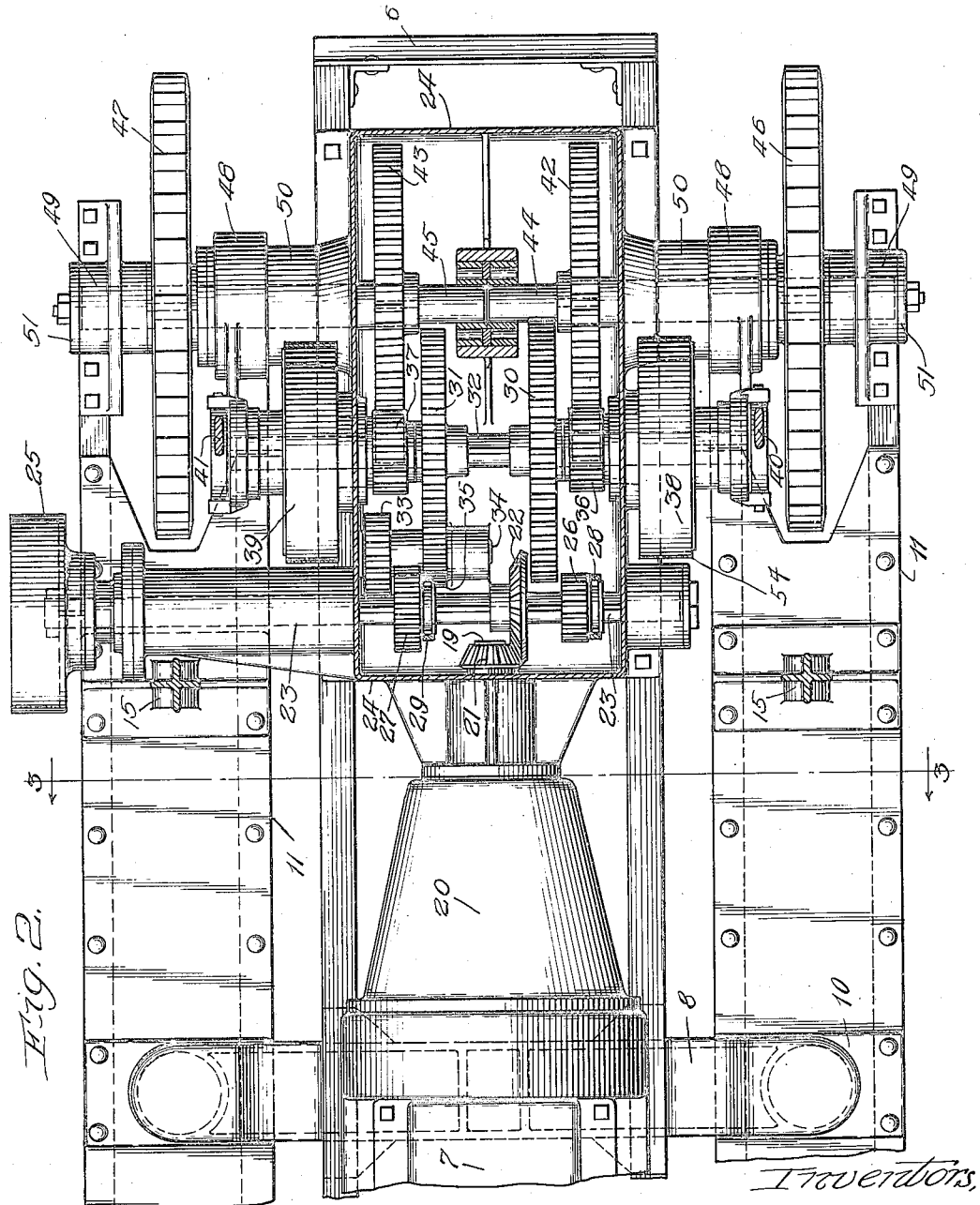

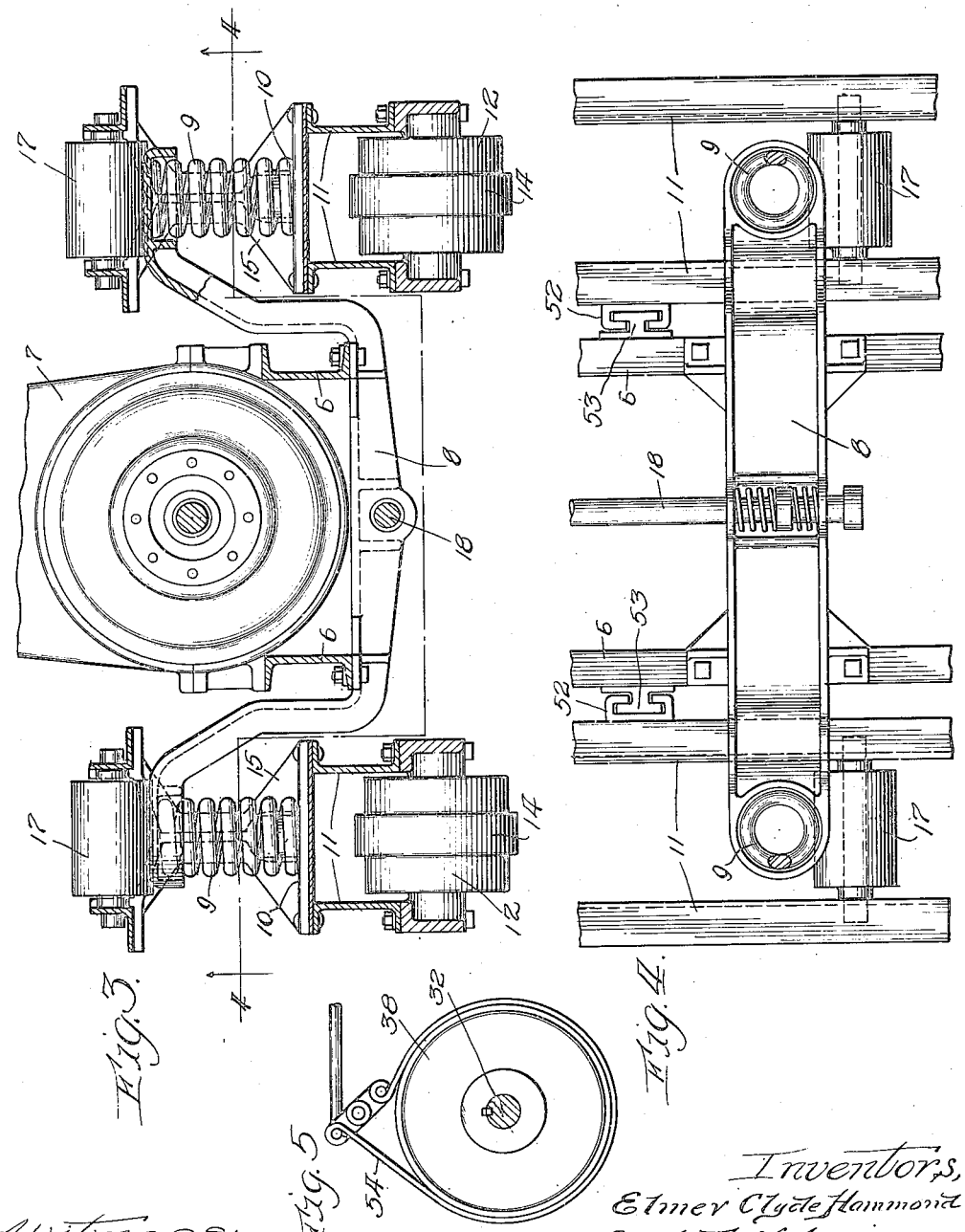

ELMER CLYDE HAMMOND AND CARL F. NELSON, OF KNOXVILLE, TENNESSEE.

TRACTOR.

1,403,407.  Specification of Letters Patent.  Patented Jan. 10, 1922.

Application filed February 27, 1919. Serial No. 279,512.

*To all whom it may concern:*

Be it known that we, ELMER CLYDE HAMMOND and CARL F. NELSON, both citizens of the United States, residing at Knoxville, in the county of Knox and State of Tennessee, have invented certain new and useful Improvements in Tractors, of which the following is a specification.

This invention relates to tractors intended for agricultural and other purposes, and particularly to caterpillar tractors or those having link belt tracks or traction members.

The objects of the invention are, to improve the general construction of such machines; to provide a tractor having separate controlling mechanism for the traction devices on the opposite sides of the vehicle; to provide an improved form of propelling mechanism; to provide a novel arrangement for mounting the driving mechanism on the supporting devices; and, in general, to provide such advantages and improvements as will appear more fully from the following description.

In the accompanying drawings illustrating this invention:

Figure 1 is a side elevation of a tractor embodying this invention, parts being omitted or shown diagrammatically for convenience in illustration;

Figure 2 is a plan view of the main portion of the machine, with parts broken away or shown diagrammatically;

Figure 3 is a cross sectional view on the line 3—3 of Fig. 2;

Figure 4 is a detail sectional view taken on the line 4—4 of Fig. 3; and

Figure 5 is a detail of the brake mechanism.

As illustrated in these drawings, 6 represents the main frame of the tractor, which supports the engine or motor 7 and driving mechanism. The front end of the main frame or body portion of the machine is supported on a transverse yoke or tie 8, the outer upwardly extending ends of which rest on springs 9, which are supported on seats 10 secured to side beams or auxiliary frame members 11. The rear end of the main frame is also supported on these side frame members in a manner which will presently be described.

The beams 11 are provided with track or truck wheels 12, which rest and roll upon the track provided by the endless flexible traction belt 13, these wheels 12 having central projections 14 which engage with the track link members to hold the parts in proper alignment. The side beams 11 are also provided with brackets 15 which support longitudinal bars 16, upon which are mounted guide rollers 17 for the upper reaches of the traction belts. The yoke 8 also provides means for the attachment of a drawbar 18 for pulling the load.

The power plant for the tractor comprises the engine or motor 7, with transmission means for driving and controlling the tractor belts 13. The engine 7 drives a propeller shaft 19 through the medium of any suitable clutch mechanism which may be enclosed in the casing 20. The shaft 19 has a beveled pinion 21, which engages with a gear 22 on a transverse shaft 23, which shaft is mounted in suitable bearings in the gear case 24 and is provided at one end with a pulley 25 for driving belts for operating stationary machines.

Two pinions 26 and 27 are slidably keyed on the shaft 23, and are actuated by any suitable shifter mechanism such as indicated at 28 and 29. The gears and the pinions 26 and 27 respectively are adapted to engage at times with gears 30 and 31, which are rigidly mounted on a transverse shaft 32, which shaft is also mounted in suitable bearings in the gear casing 24. The pinion 27 is also adapted to engage with a reverse gear 33 which is mounted on a stub shaft 34, which in turn carries a gear 35 which is in engagement with the gear 31, thus forming an ordinary reverse gear construction.

It will be noted that the pinion 26 is smaller than the pinion 27, so that they provide low and high speed for the forward movement of the machine, but only one speed for the reverse movement. The shaft 32 is provided with pinions 36 and 37, which are loosely or revolvably mounted thereon and are controlled by clutches 38 and 39, the driving portions of these clutches being fixed to the shaft 32, while the driven portions are fixed to the respective pinions 36 and 37, so that either pinion may be driven independently of the other. The clutches may be of any ordinary or preferred form of construction and may be controlled in any well known manner, as by means of controlling arms or levers indicated at 40 and 41. The pinions 36 and 37 mesh respectively with gears 42 and 43 on the rear axle shafts 44 and 45. These shafts are in alignment and carry the driving sprockets 46 and 47 for driving the link belts 13 on the opposite sides of the tractor, these belts also being supported by front idler wheels 55 mounted on the auxiliary frame members 11.

The end of the body portion of the tractor is supported on the auxiliary frame members 11 by means of brackets 48 and 49. The brackets 48 are journaled on hubs or projections 50, which extend outwardly from the transmission case 24, this case being securely fastened to the main frame 6. The brackets or bearings 49 are journaled on the hubs of the driving sprockets 46 and 47, these parts being held in position by caps 51 secured to the ends of the axle shafts 44 and 45. The brackets 48 and 49 are rigidly secured to the side frame members 11. The front ends of the auxiliary frame members 11 are held in fixed lateral position by means of guides 52 which are rigidly secured to the beams and engage with guide members 53 rigidly secured to the main frame, these guide members being formed so that the frame members may swing about the center of the support at the rear end of the machine while being held against lateral displacement.

It is desirable to lock the track or endless tractor belt when the power is disconnected therefrom, particularly to prevent the belt from crawling along the ground in making short turns. In order to do this, we provide brake mechanism for controlling the respective belts on the opposite sides of the tractor. This is conveniently done by arranging brake bands 54, which engage with the female or driven members of the clutches 38 and 39, as indicated in Fig. 5. These bands may be operated in any well known manner.

It will be observed that the tractor will be provided with the necessary controlling levers, clutch operating pedals, and the like, but as the specific construction of these devices forms no part of the present invention, they are omitted from the description and drawings.

The operation of our tractor will be readily understood from the preceding description. When the pinion 26 is thrown into engagement with the gear 30, the shaft 32 will be turned to drive the machine forwardly. If both of the clutches 38 and 39 are in driving engagement, both of the tractor belts will be driven through the connecting gearing. If it is desired to turn, one of the clutches will be thrown out of engagement and the corresponding tractor belt will not be driven. If it is desired to prevent any movement of this belt, the corresponding brake band 54 will be tightened, which will prevent the turning of the adjacent pinion and the gearing connecting the same with the tractor belt. If higher speed is desired, the pinion 26 is thrown out of engagement, and the pinion 27 is thrown into engagement with the gear 31, and the machine may be operated in the same manner as just described. If it is desired to reverse the tractor, the pinion 27 is brought into engagement with the gear 33, which will reverse the movement of the shaft 32, and the tractor belts may be controlled individually in the backward movement in the same manner as the forward movement.

It will be observed that changes may be made in the arrangement of parts and details of construction without departing from the scope of this invention, and it will also be noted that the various bearings may be provided with anti-friction devices, and other refinements in construction may be made within the scope of this invention. Therefore, we do not wish to be limited to the exact arrangement herein shown and described, but what we claim is:

In a tractor, the combination of a main driving shaft, power means for driving said shaft, a pinion on said shaft, a transverse shaft, a gear on said transverse shaft, which engages with said pinion, two pinions slidably keyed on the transverse shaft, means for sliding said pinions, a counter shaft, gears secured to said counter shaft and adapted to be engaged by said pinions, reverse gearing coacting with one of said last named gears and pinions for reversing the movement of the counter shaft, pinions loosely mounted on said counter shaft, clutches for said last named pinions, axle members, each member having a gear which engages with one of the respective pinions, driving sprockets carried by said axle members, link belts driven by said sprockets and brakes for the respective clutches for controlling the pinions driven by said clutches.

ELMER CLYDE HAMMOND.
CARL F. NELSON.